(12) United States Patent
Yasuda et al.

(10) Patent No.: US 12,466,250 B2
(45) Date of Patent: Nov. 11, 2025

(54) VIBRATION DAMPING DEVICE

(71) Applicant: Sumitomo Riko Company Limited, Aichi (JP)

(72) Inventors: Takayoshi Yasuda, Aichi (JP); Kenji Kuroda, Aichi (JP); Takaya Ito, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 410 days.

(21) Appl. No.: 18/165,334

(22) Filed: Feb. 7, 2023

(65) Prior Publication Data

US 2023/0173907 A1 Jun. 8, 2023

Related U.S. Application Data

(63) Continuation of application No. PCT/JP2022/009120, filed on Mar. 3, 2022.

(30) Foreign Application Priority Data

Mar. 25, 2021 (JP) ................................ 2021-052068

(51) Int. Cl.
*B60K 5/12* (2006.01)

(52) U.S. Cl.
CPC ................................. *B60K 5/1208* (2013.01)

(58) Field of Classification Search
CPC ...... B60K 5/1208; B60K 5/12; B60K 5/1225; F16F 1/387; F16F 13/10; F16F 15/08
See application file for complete search history.

(56) References Cited

U.S. PATENT DOCUMENTS

| | | | |
|---|---|---|---|
| 8,356,806 B2 * | 1/2013 | Garety | F16F 13/108 |
| | | | 267/140.13 |
| 8,474,800 B2 | 7/2013 | Okumura et al. | |

(Continued)

FOREIGN PATENT DOCUMENTS

| | | |
|---|---|---|
| JP | 2005-009626 | 1/2005 |
| JP | 2008-240998 | 10/2008 |

(Continued)

OTHER PUBLICATIONS

Japanese Patent No. JP 2012202496 to Kosugi et al.published on Oct. 22, 2012.*

(Continued)

*Primary Examiner* — Pamela Rodriguez
(74) *Attorney, Agent, or Firm* — JCIPRNET

(57) ABSTRACT

In a vibration damping device, a main rubber elastic body has a truncated cone shape and includes a recess open to a lower surface. A central axis of an inner member is arranged eccentric with respect to a central axis of an outer cylindrical member in an axis-perpendicular direction. The main rubber elastic body that connects the inner member and the outer cylindrical member has different free lengths on one side and the other side in an eccentric direction. A continuous rubber that covers a lower end of the inner member without exposing the lower end of the inner member to the recess and connects the main rubber elastic body on one side in the eccentric direction and the main rubber elastic body on the other side in the eccentric direction is integrally formed with the main rubber elastic body.

10 Claims, 4 Drawing Sheets

(56) References Cited

U.S. PATENT DOCUMENTS

| | | | |
|---|---|---|---|
| 10,393,212 B2 | 8/2019 | Ikawa et al. | |
| 2018/0172107 A1* | 6/2018 | Ikawa | F16F 1/387 |

FOREIGN PATENT DOCUMENTS

| | | |
|---|---|---|
| JP | 2010-106866 | 5/2010 |
| JP | 2018-100727 | 6/2018 |
| JP | 2020051474 | 4/2020 |

OTHER PUBLICATIONS

Office Action of Japan Counterpart Application, with English translation thereof, issued on Jan. 23, 2024, pp. 1-8.

"International Search Report (Form PCT/ISA/210) of PCT/JP2022/009120", mailed on May 17, 2022, with English translation thereof, pp. 1-5.

"Written Opinion of the International Searching Authority (Form PCT/ISA/237) of PCT/JP2022/009120", mailed on May 17, 2022, with English translation thereof, pp. 1-8.

* cited by examiner

VIBRATION DAMPING DEVICE

CROSS-REFERENCE TO RELATED APPLICATION

This application is a continuation of PCT International Application No. PCT/JP2022/009120, filed on Mar. 3, 2022, which claims priority under 35 U.S.C. § 119(a) to Japanese Patent Application No. 2021-052068, filed on Mar. 25, 2021. Each of the above application(s) is hereby expressly incorporated by reference, in its entirety, into the present application.

BACKGROUND

Technical Field

The disclosure relates to a vibration damping device used in, for example, an engine mount of an automobile.

Related Art

Conventionally, as a vibration damping device applied in, for example, an engine mount of an automobile, there is known one having a structure in which an inner member and an outer cylindrical member arranged spaced apart on an outer peripheral side of the inner member are connected by a main rubber elastic body. Such a vibration damping device is shown in, for example, Japanese Patent Laid-Open No. 2020-051474.

In such a vibration damping device, in one radial direction orthogonal to a central axis, a load input in one direction and a load input in the opposite direction may differ greatly. For example, by fixing the inner member to a power unit side and the outer cylindrical member to a vehicle body side, and mounting the vibration damping device with the central axis facing a vertical up-down direction, the engine mount for an automobile is configured. In such a case, in one radial direction corresponding to a front-rear direction of a vehicle, a load during braking applied by the inner member to the outer cylindrical member in a direction toward the front side of the vehicle may be much smaller than a load during acceleration applied by the inner member to the outer cylindrical member in an opposite direction toward the rear side of the vehicle.

For that reason, deformation (strain) or stress that is repeatedly applied to the main rubber elastic body as a load is input may be partially different, and it becomes difficult to ensure durability of a portion where large strain or stress is repeatedly induced. Thus, there is concern that the durability of such a portion may inhibit the durability of the entire vibration damping device.

In order to deal with such a problem, it has been considered to partially change a member thickness of the main rubber elastic body. However, problems such as adverse effects on spring properties and relative deterioration of the durability in a thin portion may arise, and it has been difficult to obtain a sufficient effect only by adjusting the member thickness of the main rubber elastic body.

SUMMARY

According to one aspect of the disclosure, a vibration damping device is provided in which an inner member and an outer cylindrical member arranged spaced apart on an outer peripheral side of the inner member are connected by a main rubber elastic body. In the vibration damping device, the main rubber elastic body has a truncated cone shape and includes a recess open to a lower surface. A member central axis of the inner member is eccentric with respect to a member central axis of the outer cylindrical member in an axis-perpendicular direction. A free length of the main rubber elastic body in a direction in which the inner member and the outer cylindrical member face each other on one side in an eccentric direction and a free length of the main rubber elastic body in the direction in which the inner member and the outer cylindrical member face each other on the other side in the eccentric direction are made different from each other. A continuous rubber that covers a lower end of the inner member without exposing the lower end of the inner member to the recess and connects the main rubber elastic body on one side in the eccentric direction and the main rubber elastic body on the other side in the eccentric direction is integrally formed with the main rubber elastic body.

According to another aspect of the disclosure, a vibration damping device is provided in which an inner member and an outer cylindrical member arranged spaced apart on an outer peripheral side of the inner member are connected by a main rubber elastic body. In the vibration damping device, the main rubber elastic body has a truncated cone shape and includes a recess open to a lower surface. A circumferential positioning part is provided for positioning the vibration damping device in a circumferential direction while the vibration damping device is mounted with a central axis direction thereof being an up-down direction of a vehicle, and a front-rear direction of the vehicle is defined by the circumferential positioning part. A member central axis of the inner member is arranged eccentric with respect to a member central axis of the outer cylindrical member in the front-rear direction of the vehicle, a free length of the main rubber elastic body extending to the front side of the vehicle from the inner member toward the outer cylindrical member and a free length of the main rubber elastic body extending to the rear side of the vehicle are made different from each other, and a free length of the main rubber elastic body with which the inner member is displaced toward the outer cylindrical member during vehicle acceleration is larger than a free length of the main rubber elastic body with which the inner member is displaced away from the outer cylindrical member during vehicle acceleration.

DESCRIPTION OF THE EMBODIMENTS

Figure 1:
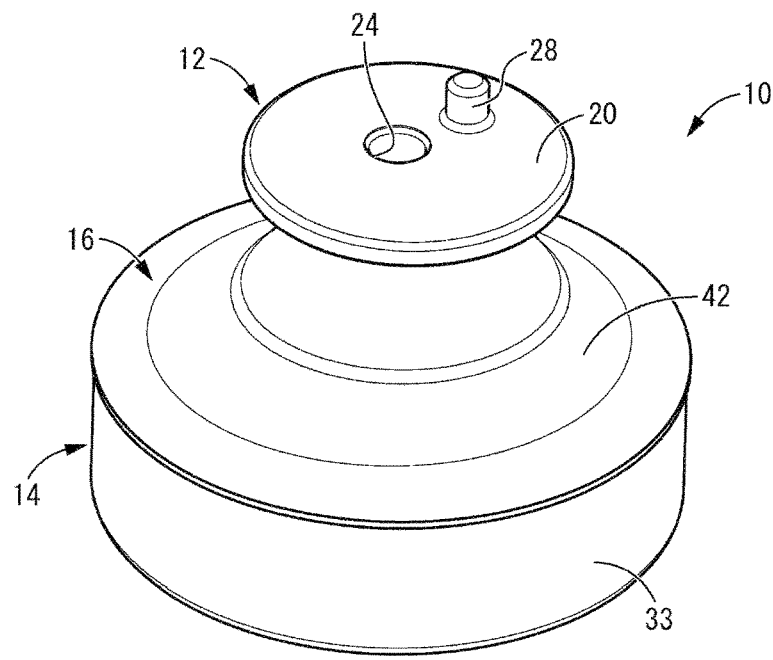
FIG. 1 is a perspective view showing a vibration damping device as one embodiment of the disclosure.

The disclosure provides a vibration damping device having a structure in which durability can be sufficiently ensured even if a load input in one direction and a load input in the opposite direction differ greatly in one radial direction orthogonal to a central axis.

Described below are aspects for understanding of the disclosure. However, the aspects described below are exemplary and may be adopted in combination with each other as appropriate. Moreover, components described in each aspect may be recognized and adopted independently wherever possible, and may be adopted in combination with any component described in another aspect as appropriate. Accordingly, in the disclosure, various different aspects may be realized and the disclosure is not limited to the aspects described below.

According one aspect, a vibration damping device is provided in which an inner member and an outer cylindrical member arranged spaced apart on an outer peripheral side of the inner member are connected by a main rubber elastic body. In the vibration damping device, the main rubber elastic body has a truncated cone shape and includes a recess open to a lower surface. A member central axis of the inner member is eccentric with respect to a member central axis of the outer cylindrical member in an axis-perpendicular direction. A free length of the main rubber elastic body in a direction in which the inner member and the outer cylindrical member face each other on one side in an eccentric direction and a free length of the main rubber elastic body in the direction in which the inner member and the outer cylindrical member face each other on the other side in the eccentric direction are made different from each other. A continuous rubber that covers a lower end of the inner member without exposing the lower end of the inner member to the recess and connects the main rubber elastic body on one side in the eccentric direction and the main rubber elastic body on the other side in the eccentric direction is integrally formed with the main rubber elastic body.

According to the present aspect, on one side and the other side of the inner member in one direction orthogonal to a central axis of the vibration damping device, the main rubber elastic body that connects the inner member and the outer cylindrical member has different free lengths. Hence, even if loads input on both sides in, for example, the axis-perpendicular direction, have different magnitudes, it is possible to suppress strain or stress induced in the main rubber elastic body from being excessive on one side, and it is possible to avoid significant deterioration of durability of the vibration damping device resulting from the occurrence of local strain or stress in the main rubber elastic body.

In addition, if large strain or stress is caused in the main rubber elastic body on one side of the inner member in the axis-perpendicular direction, the strain or stress may be transmitted via a continuous rubber to the main rubber elastic body on the other side of the inner member in the axis-perpendicular direction. Accordingly, strain or stress concentration in the main rubber elastic body only on the one side may be reduced and the strain or stress may be dispersed. As a result, durability of the main rubber elastic body as well as durability of the vibration damping device may be improved.

According to another aspect, in the vibration damping device according to the above aspect, a mounting central axis of the inner member and a mounting central axis of the outer cylindrical member are coaxial.

According to another aspect, a vibration damping device is provided in which an inner member and an outer cylindrical member arranged spaced apart on an outer peripheral side of the inner member are connected by a main rubber elastic body. In the vibration damping device, the main rubber elastic body has a truncated cone shape and includes a recess open to a lower surface. A circumferential positioning part is provided for positioning the vibration damping device in a circumferential direction while the vibration damping device is mounted with a central axis direction thereof being an up-down direction of a vehicle, and a front-rear direction of the vehicle is defined by the circumferential positioning part. A member central axis of the inner member is arranged eccentric with respect to a member central axis of the outer cylindrical member in the front-rear direction of the vehicle, a free length of the main rubber elastic body extending to the front side of the vehicle from the inner member toward the outer cylindrical member and a free length of the main rubber elastic body extending to the rear side of the vehicle are made different from each other, and a free length of the main rubber elastic body with which the inner member is displaced toward the outer cylindrical member during vehicle acceleration is larger than a free length of the main rubber elastic body with which the inner member is displaced away from the outer cylindrical member during vehicle acceleration.

In a vehicle vibration damping device as a target of the present aspect, for example, in an engine mount for an automobile, since a torque reaction force in addition to acceleration G is applied during acceleration, a large load is likely to be input as compared to during deceleration, and the durability is difficult to ensure. As a result of repeated studies by the inventors on the cause, the following has been found. It has been generally considered that the main rubber elastic body in a portion that undergoes tensile deformation when a load is input has insufficient durability, and the occurrence of cracks or the like in a portion of the main rubber elastic body where a tensile load is applied during acceleration is the cause of poor durability. However, the problem is not that simple. Furthermore, it has been attempted to improve the durability by increasing a free length or a thickness of the main rubber elastic body and ensuring rubber volume on a side where the tensile load is normally input during acceleration, that is, a side where the inner member is displaced away from the outer cylindrical member during vehicle acceleration. However, in that case, the durability may not be able to be effectively improved, and there is concern that vibration damping performance in an axial direction may be adversely affected.

Here, in the vibration damping device according to the present aspect, contrary to the usual measure as described above, a free length of the main rubber elastic body is set large on a side opposite to the side where the tensile load is input during acceleration, that is, a side where the inner member is displaced toward the outer cylindrical member during vehicle acceleration. As a result, it is possible to suppress strain or stress induced in the main rubber elastic body from being excessive on one side, and it is possible to avoid significant deterioration of durability of the vibration damping device resulting from the occurrence of local strain or stress in the main rubber elastic body. The disclosure like this is based on the following finding. In the case where a load applied differs greatly from a front side to a rear side of the vehicle with respect to the inner member, on one side in the front-rear direction of the vehicle where the inner member is relatively displaced toward the outer cylindrical member due to a large input load (acceleration side), the main rubber elastic body is greatly compressed as compared to the other side (deceleration side) in the front-rear direction of the vehicle, and is deformed so as to wrap around toward both circumferential sides of the inner member. Large strain or stress in a shear direction is likely to occur in an inner peripheral portion of the main rubber elastic body fixed to the inner member, which is a reason that durability is difficult to ensure in an engine mount of a conventional structure.

In the vibration damping device according to the present aspect completed based on such finding, contrary to a conventional general measure to ensure durability, by setting a large free length of the main rubber elastic body in a portion that is on the compressed side during vehicle acceleration when a larger load is input than during vehicle deceleration, the amount of deformation of the main rubber elastic body wrapping around both circumferential sides of the inner member in association with compressive deformation in the aforesaid portion is suppressed, and the occurrence of strain or stress in the shear direction may be efficiently reduced. As a result, no significant impairment occurs in the vibration damping performance in the axial direction and the durability may be improved.

According to another aspect, in the vibration damping device according to the above aspect, a mounting central axis of the inner member and a mounting central axis of the outer cylindrical member are coaxial both before and after mounting of the vibration damping device onto the vehicle.

In the present aspect, strain or stress concentration in the main rubber elastic body due to a static input load in the state in which the vibration damping device is mounted may be prevented, and an expected effect produced by eccentricity of the member central axis of the inner member with respect to the member central axis of the outer cylindrical member may be stably exhibited.

According to another aspect, in the vibration damping device according to any one of the above aspects, an outer peripheral surface and an inner peripheral surface of the main rubber elastic body each have a perfectly circular shape in a section in the axis-perpendicular direction.

According to the present aspect, deformation of the main rubber elastic body in association with displacement of the inner member and the outer cylindrical member toward or away from each other during input of a load in the axis-perpendicular direction can be caused to occur while relatively reliably avoiding local concentration of strain or stress, and the durability may further be improved.

According to another aspect, in the vibration damping device according to any one of the above aspects, on at least one of an outer peripheral surface and an inner peripheral surface of the main rubber elastic body, a surface length is made different between both side portions in the eccentric direction of the member central axis of the inner member with respect to the member central axis of the outer cylindrical member.

According to the present aspect, by making the surface length of at least one of the outer peripheral surface and the inner peripheral surface of the main rubber elastic body different on both sides in the eccentric direction of the member central axis of the inner member with respect to the member central axis of the outer cylindrical member, the free lengths of the main rubber elastic body on both sides in the eccentric direction can be set different from each other. Thus, the durability of the vibration damping device may be relatively reliably improved.

According to the disclosure, a vibration damping device can be provided in which durability can be sufficiently ensured even if a load input in one direction and a load input in the opposite direction differ greatly in one radial direction orthogonal to a central axis.

An embodiment of the disclosure will be described below with reference to the drawings.

FIG. 1 to FIG. 7 show an engine mount 10 for an automobile as one embodiment of a vibration damping device according to the disclosure. The engine mount 10 has a structure in which an inner member 12 and an outer cylindrical member 14 are connected by a main rubber elastic body 16. For example, by fixing a power unit (not shown) to the inner member 12 and fixing a vehicle body (not shown) to the outer cylindrical member 14, the vehicle body is caused to support the power unit in a vibration damping manner. Although the orientation of the engine mount 10 when mounted on a vehicle is not limited, in the following description, the term "up-down direction" refers to the up-down direction in FIG. 3 that is regarded as a vertical direction, the term "left-right direction" refers to the up-down direction in FIG. 2 that is the left-right direction of the vehicle, and the term "front-rear direction" refers to the right-left direction in FIG. 2 that is the front-rear direction of the vehicle. In the present embodiment, the engine mount 10 is mounted on the vehicle in each of these directions.

More specifically, the inner member 12 is a hard member made of metal, fiber-reinforced synthetic resin, or the like, and includes a fixed part 18 to which the main rubber elastic body 16 is fixed. The fixed part 18 is a columnar portion extending in the up-down direction. In the present embodiment, the fixed part 18 has a circular shape in a section (cross section) in an axis-perpendicular direction shown in FIG. 6. Particularly, in the present embodiment, the fixed part 18 has a perfectly circular cross section. A lower end portion of the fixed part 18 has a tapered shape (substantially hemispherical shape) with a rounded tip. However, the tip (lower end) may have a flat surface extending in the axis-perpendicular direction. At an upper end portion of the inner member 12, an outer flange-like part 20 annularly protruding toward an outer peripheral side is provided over the entire circumference in a circumferential direction.

Reference numeral 22 in the drawings denotes an inner central axis as a member central axis connecting, in the axial direction, sectional center points of sections of the inner member 12 in the axis-perpendicular direction. The inner central axis 22 extends vertically, and the inner member 12 of the present embodiment has an outer peripheral surface having a rotationally symmetrical shape about the inner central axis 22.

In the inner member 12, a bolt hole 24 into which a bolt (not shown) is screwed is provided extending axially downward from an upper end surface. The power unit may be fixed to the inner member 12 by a fixing bolt screwed into the bolt hole 24. That is, in the power unit, a connection fixing point to be connected to the vehicle body side via the engine mount 10 is set. At this connection fixing point, the power unit may be fixed to the inner member 12 on a mount central axis of the engine mount 10. Hence, the bolt hole 24 regarded as a fixing point in the inner member 12 is set on a central axis (outer central axis 32 to be described later) of the outer cylindrical member 14 and the main rubber elastic body 16 that serves as the mount central axis. A central axis of the bolt hole 24 is an inner mounting axis 26 as a mounting central axis of the inner member 12 with respect to the power unit. The inner mounting axis 26 is located out of alignment (eccentrically) with respect to the inner central axis 22. In the present embodiment, the inner mounting axis 26 is located behind the inner central axis 22, and both extend parallel to the vertical direction.

Furthermore, a pin-like protrusion 28 as a circumferential positioning part for positioning the engine mount 10 in the circumferential direction is provided on the upper end surface of the inner member 12. The pin-like protrusion 28 is configured to be inserted into the power unit, for example, when the inner member 12 is fixed to the power unit. In the present embodiment, the pin-like protrusion 28 is located to the left of the bolt hole 24, and the pin-like protrusion 28 and the bolt hole 24 are arranged in parallel in the left-right direction. That is, in a plan view shown in FIG. 2, a direction orthogonal to a direction in which the pin-like protrusion 28 and the bolt hole 24 are arranged side by side is the front-rear direction. By arranging the pin-like protrusion 28 to the left of the vehicle, it is possible to define the front-rear direction of the inner member 12 (engine mount 10) as well as the front-rear direction of the vehicle on which the engine mount 10 is mounted.

Figure 7:
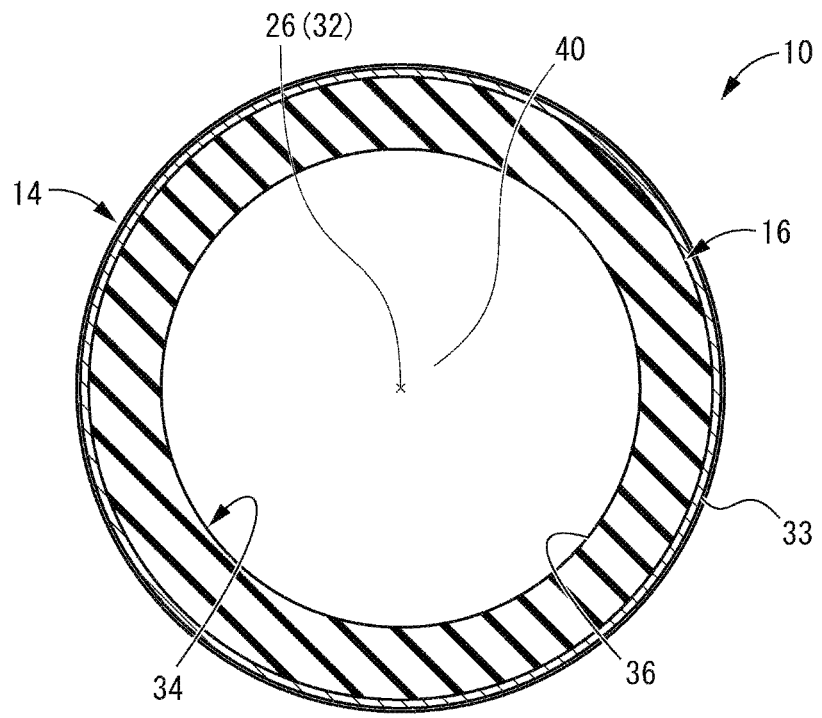
FIG. 7 is a sectional view along VII-VII in FIG. 3.

The outer cylindrical member 14 has a tubular shape with a relatively thin wall and has a larger diameter than the inner member 12. In the present embodiment, the outer cylindrical member 14 has a cylindrical shape. Particularly, in the present embodiment, the outer cylindrical member 14 has a perfectly circular cross section, as also shown in FIG. 7. At a lower end of the outer cylindrical member 14, an inner flange-like part 30 annularly protruding toward an inner peripheral side is provided over the entire circumference in the circumferential direction. An upper end of the outer cylindrical member 14 slightly extends toward the outer peripheral side over the entire circumference.

Reference numeral 32 in the drawings denotes an outer central axis as a member central axis connecting, in the axial direction, sectional center points of sections of the outer cylindrical member 14 in the axis-perpendicular direction. The outer central axis 32 extends vertically, and the outer cylindrical member 14 of the present embodiment has an outer peripheral surface having a rotationally symmetrical shape about the outer central axis 32.

On the outer peripheral surface of the outer cylindrical member 14, for example, a subframe or the like on the vehicle body side, such as a bracket (not shown) having a substantially tubular shape, is inserted, for example, in a press-fit state. Accordingly, the outer cylindrical member 14 is fixed to the vehicle body via the subframe or the like. That is, the outer peripheral surface of the outer cylindrical member 14 is an outer fixing surface 33 fixed to a member on the vehicle body side. A central axis connecting, in the axial direction, sectional center points of sections of the outer fixing surface 33 in the axis-perpendicular direction is regarded as an outer mounting axis as a mounting central axis of the outer cylindrical member 14 with respect to the vehicle body. In the present embodiment, the outer central axis 32 being a member central axis of the outer cylindrical member 14 and the outer mounting axis being a mounting central axis are coaxial. Accordingly, in the present embodiment, the inner mounting axis 26 being the mounting central axis of the inner member 12 and the outer mounting axis (outer central axis 32) being the mounting central axis of the outer cylindrical member 14 are coaxial. In the drawings, the engine mount 10 is shown in a state before being mounted on the vehicle. However, even in a case where a static load that shares and supports the power unit is applied in a direction of the mount central axis (outer central axis 32) in the state in which the engine mount 10 is mounted on the vehicle, the inner mounting axis 26 and the outer mounting axis (outer central axis 32) are also coaxial.

The fixed part 18 of the inner member 12 and the outer cylindrical member 14 are arranged apart from each other in the up-down direction. The fixed part 18 of the inner member 12 and the outer cylindrical member 14 arranged spaced apart on the outer peripheral side of the inner member 12 are elastically connected by the main rubber elastic body 16. The main rubber elastic body 16, as a whole, has a substantially truncated cone shape increasing in diameter downward, in which the fixed part 18 is embedded in an upper end (end on a small diameter side) of the main rubber elastic body 16, and an upper end surface of the main rubber elastic body 16 is fixed to while partially overlapping the outer flange-like part 20. The outer cylindrical member 14 overlaps and is fixed to a surface at a lower end (end on a large diameter side) of the main rubber elastic body 16. In the present embodiment, the main rubber elastic body 16 is formed as an integrally vulcanized molded product including the inner member 12 and the outer cylindrical member 14.

The main rubber elastic body 16 is provided with a recess 34 open to a lower surface. The recess 34 has a substantially spherical cap-shaped inner surface and gradually increases in diameter downward. The recess 34 is provided inside an inner peripheral end of the inner flange-like part 30 of the outer cylindrical member 14. Hence, the recess 34 of the present embodiment opens to the outside through a lower opening of the outer cylindrical member 14.

As also shown in FIG. 7, the recess 34 of the present embodiment has a circular cross section. Particularly, in the present embodiment, the recess 34 has a perfectly circular cross section. That is, in the present embodiment, the center of the opening and the center of the bottom of the recess 34 are located in the same position in the cross section shown in FIG. 7. In short, the recess 34 has a central axis extending in the up-down direction, and the center of the opening and the center of the bottom of the recess 34 are located on the central axis. The recess 34 has an inner surface that is rotationally symmetrical about the central axis.

In the present embodiment, the central axis of the recess 34 and the member central axis (outer central axis 32) of the outer cylindrical member 14 are coaxial. Accordingly, an inner peripheral surface 36 of the main rubber elastic body 16 constituted by the inner surface of the recess 34 has a perfectly circular shape centered on a central axis (outer central axis 32) of the engine mount 10 in a section (cross section) in the axis-perpendicular direction.

By providing the recess 34 like this, the main rubber elastic body 16 has a shape in which a rubber that substantially connects the inner member 12 and the outer cylindrical member 14 in an oblique direction is continuous over the entire circumference in the circumferential direction. A depth (dimension in the up-down direction) of the recess 34 is defined so that the recess 34 does not reach the fixed part 18 of the inner member 12 that is fixed while embedded in the upper end of the main rubber elastic body 16 and a lower end of the inner member 12 is not exposed to the recess 34. In short, in an inner peripheral portion of the main rubber elastic body 16 connecting the inner member 12 and the outer cylindrical member 14 in the oblique direction, a continuous rubber 40 is provided that covers the lower end of the inner member 12 and causes the main rubber elastic body 16 to be continuous. The continuous rubber 40 extends in the axis-perpendicular direction, and connects the inner peripheral portion of the main rubber elastic body 16 in each axis-perpendicular direction including the front-rear direction and the left-right direction. In the present embodiment, the continuous rubber 40 is integrally formed with the main rubber elastic body 16.

Figure 2:
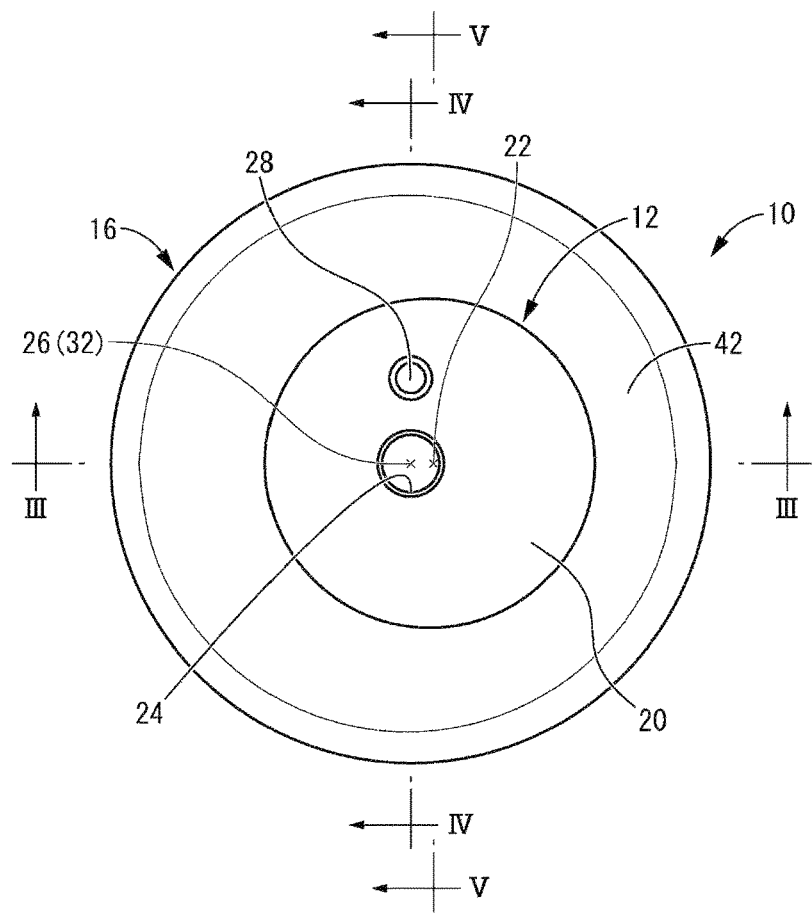
FIG. 2 is a plan view of the vibration damping device shown in FIG. 1.
Figure 3:
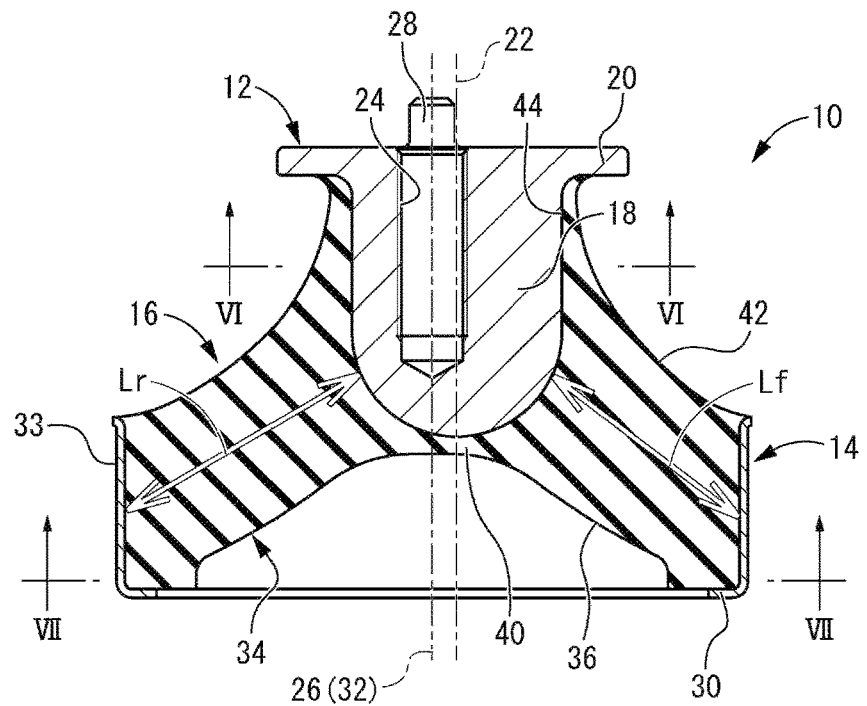
FIG. 3 is a sectional view along in FIG. 2.
Figure 4:
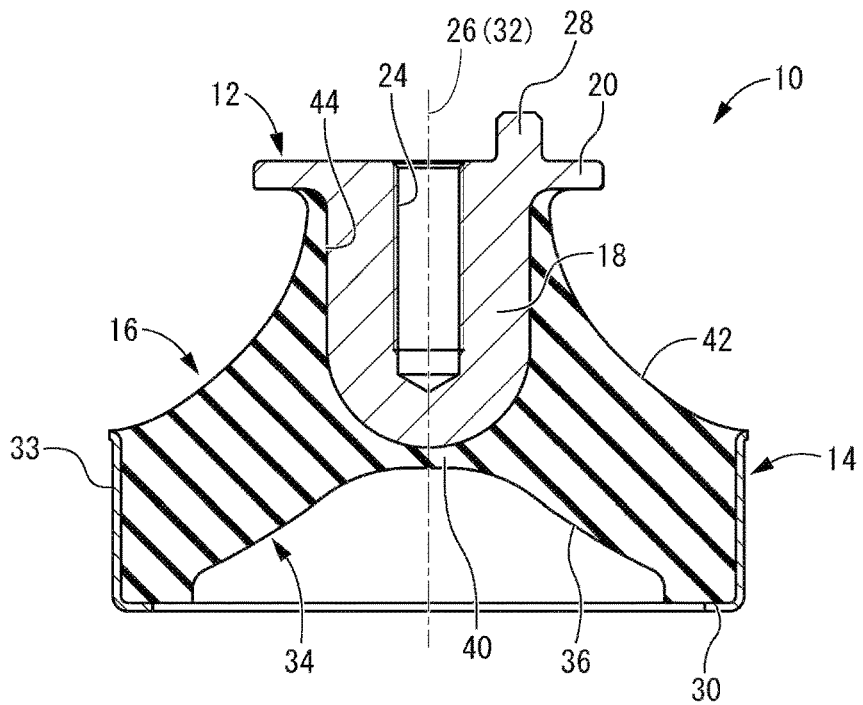
FIG. 4 is a sectional view along IV-IV in FIG. 2.
Figure 5:
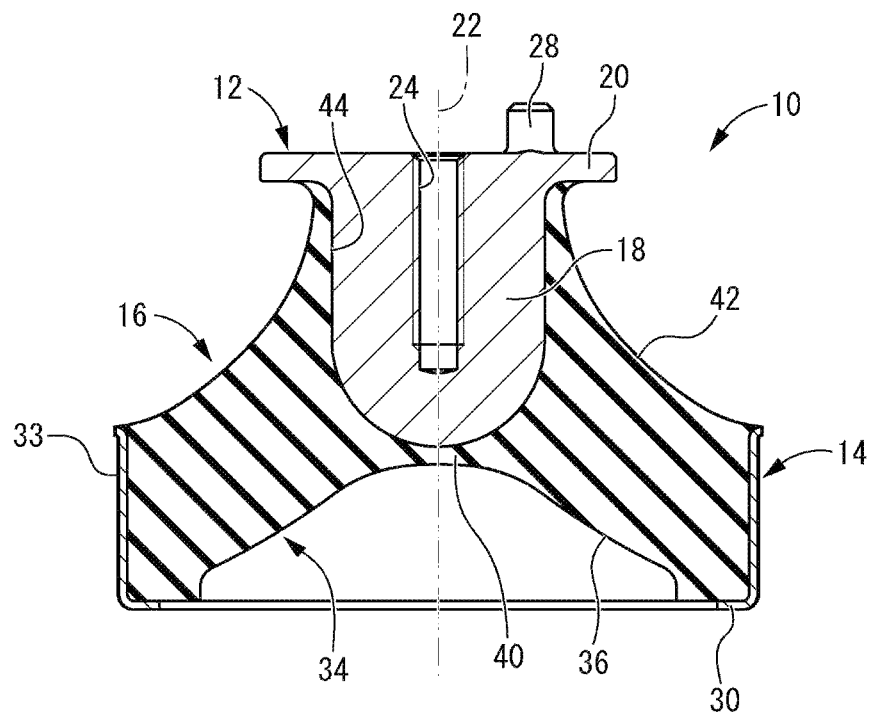
FIG. 5 is a sectional view along V-V in FIG. 2.

Here, in the engine mount 10, the member central axis (inner central axis 22) of the inner member 12 is eccentric in the axis-perpendicular direction with respect to the member central axis (outer central axis 32) of the outer cylindrical member 14. In the present embodiment, as also shown in FIG. 2 and FIG. 3, the inner central axis 22 and the outer central axis 32 are out of alignment in the front-rear direction. Particularly, in the present embodiment, the inner central axis 22 is arranged forward of the outer central axis 32.

Accordingly, in the main rubber elastic body 16, a free length in a direction in which the inner member 12 and the outer cylindrical member 14 face each other varies in the circumferential direction. Specifically, as indicated by white arrows in FIG. 3, a free length Lf of the main rubber elastic body 16 extending to the front side of the vehicle from the inner member 12 toward the outer cylindrical member 14 on the front side being one side in the eccentric direction is shorter than a free length Lr of the main rubber elastic body 16 extending to the rear side of the vehicle from the inner member 12 toward the outer cylindrical member 14 on the rear side being the other side in the eccentric direction. In this specification, the free length of the main rubber elastic body 16 in the direction in which the inner member 12 and the outer cylindrical member 14 face each other refers to a length of the elastic center of the main rubber elastic body 16 in the direction in which the inner member 12 and the outer cylindrical member 14 face each other.

As described above, by arranging the inner central axis 22 eccentrically forward of the outer central axis 32, a surface length of an outer peripheral surface 42 of the main rubber elastic body 16 varies in the circumferential direction. That is, the surface length of the outer peripheral surface 42 of the main rubber elastic body 16 is made different between both side portions in the eccentric direction (front-rear direction), and the rear portion is longer than the front portion. In this specification, the surface length of the outer peripheral surface 42 of the main rubber elastic body 16 means a length along the outer peripheral surface 42 in the longitudinal section shown in FIG. 3 and so on.

Figure 6:
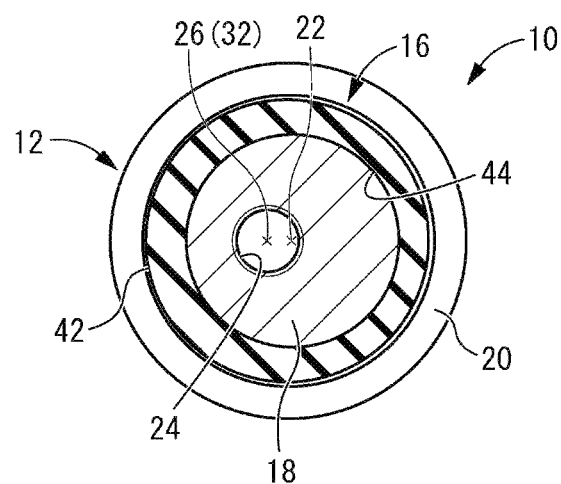
FIG. 6 is a sectional view along VI-VI in FIG. 3.

In the present embodiment, as also shown in FIG. 6, the outer peripheral surface 42 of the main rubber elastic body 16 has a perfectly circular shape in a section (cross section) in the axis-perpendicular direction. That is, in an upper portion of the main rubber elastic body 16, in a portion fixed to the fixed part 18 of the inner member 12, the center of the cross section is located relatively close to the inner central axis 22. On the other hand, the center of the cross section gradually shifts rearward toward the lower side. In a lower portion of the main rubber elastic body 16, in a portion fixed to the outer cylindrical member 14, the center of the cross section may overlap the outer central axis 32.

In the present embodiment, since the fixed part 18 has a perfectly circular cross section, an inner fixing surface 44 to which the fixed part 18 is fixed in the upper portion of the main rubber elastic body 16 also has a perfectly circular cross section.

In the engine mount 10 of the present embodiment having the structure as described above, by screwing the fixing bolt into the bolt hole 24 of the inner member 12 as described above, the inner member 12 is fixed to the power unit. By fixing the subframe or the like inserted on the outer cylindrical member 14 to a vehicle body, the outer cylindrical member 14 is fixed to the vehicle body. Accordingly, the power unit and the vehicle body are elastically connected by the engine mount 10.

During vehicle acceleration, a rearward load is input to the engine mount 10, the inner member 12 may be displaced toward the outer cylindrical member 14 in the rear portion, and the inner member 12 may be displaced away from the outer cylindrical member 14 in the front portion. During deceleration of the vehicle, a frontward load is input to the engine mount 10, the inner member 12 may be displaced toward the outer cylindrical member 14 in the front portion, and the inner member 12 may be displaced away from the outer cylindrical member 14 in the rear portion. Accordingly, in the engine mount 10, loads in opposite directions (frontward and rearward) may be input in the axis-perpendicular direction depending on acceleration or deceleration of the vehicle.

When such a load is input, particularly during vehicle acceleration, since a torque reaction force in addition to acceleration G is applied, the load is likely to be larger than during deceleration. Hence, the following finding has been obtained. The rear portion of the main rubber elastic body is compressed between the rearwardly displaced inner member and the outer cylindrical member, and is deformed so as to wrap around toward both circumferential sides of the inner member. Large strain or stress in the shear direction is likely to occur in the inner peripheral portion of the main rubber elastic body fixed to the inner member, which is a reason that durability is difficult to ensure in an engine mount of a conventional structure.

Based on such finding, in the engine mount 10 of the present embodiment, the inner central axis 22 is eccentric in the front-rear direction with respect to the outer central axis 32, and the free length Lr of the rear portion of the main rubber elastic body 16 is made larger than the free length Lf of the front portion of the main rubber elastic body 16. As a result, during vehicle acceleration, even if a relatively large load is input and the rear portion of the main rubber elastic body 16 is compressed, it is possible to suppress strain with respect to the load, and compressive strain in the rear portion or the strain in the shear direction caused by deformation of the main rubber elastic body 16 wrapping around both circumferential sides of the inner member 12 in association with the compressive strain may be reduced. Hence, even if a much larger load is applied on one side in the radial direction with respect to the inner member 12 than on the other side, it is possible to efficiently ensure the durability of the main rubber elastic body 16 while avoiding unnecessary thickening of the main rubber elastic body 16 and deterioration of vibration damping properties in association therewith.

On the other hand, during vehicle deceleration, a relatively small load is input to the front portion of the main rubber elastic body 16. Since the free length Lf of the front portion of the main rubber elastic body 16 is reduced, the front portion of the main rubber elastic body 16 is prevented from being unnecessarily long. Accordingly, an increase in size of the main rubber elastic body 16, the outer cylindrical member 14, and the engine mount 10 can be avoided.

In addition, in the present embodiment, the continuous rubber 40 is provided that connects the inner peripheral portion of the main rubber elastic body 16. Accordingly, strain or stress caused by a load applied to the rear portion of the main rubber elastic body 16 during vehicle acceleration is transmitted to the front portion or left and right portions of the main rubber elastic body 16 via the continuous rubber 40. Accordingly, strain or stress induced in the main rubber elastic body 16 can be prevented from being excessive on one side, and the durability of the main rubber elastic body 16 as well as the durability of the engine mount 10 can further be improved.

Furthermore, in the present embodiment, since the outer peripheral surface 42 and the inner peripheral surface 36 of the main rubber elastic body 16 each have a perfectly circular shape in a section in the axis-perpendicular direction, the main rubber elastic body 16 can be smoothly deformed when a load is input, and local concentration of strain or stress can be relatively effectively avoided. Accordingly, the durability of the main rubber elastic body 16 can be relatively stably improved.

Furthermore, in the present embodiment, in the outer peripheral surface 42 of the main rubber elastic body 16, the surface length is made different between both side portions in the front-rear direction being the eccentric direction of the inner central axis 22 with respect to the outer central axis 32. By varying the surface length of the outer peripheral surface 42 of the main rubber elastic body 16 in the eccentric direction (front-rear direction) in this way, the length of the free length can be appropriately set on both sides of the main rubber elastic body 16 in the front-rear direction, and the above effect of improving durability can be relatively stably exhibited.

Although the embodiments of the disclosure have been described in detail above, the disclosure is not limited by the specific description thereof.

For example, in the above embodiment, the eccentric direction of the member central axis (inner central axis 22) of the inner member 12 with respect to the member central axis (outer central axis 32) of the outer cylindrical member 14 is the front-rear direction. However, the disclosure is not limited thereto. That is, in the disclosure, it should suffice if loads of different magnitudes are input in mutually opposite directions in one direction orthogonal to a central axis of a vibration damping member, and it should suffice if the member central axis of the inner member is eccentric with respect to the member central axis of the outer cylindrical member in accordance with the directions of the loads input with different magnitudes.

In the above embodiment, the continuous rubber 40 connects the inner peripheral portion of the main rubber elastic body 16 in each axis-perpendicular direction. However, it should suffice if the continuous rubber connects at least the main rubber elastic body on one side and the main rubber elastic body on the other side in the eccentric direction of the member central axis of the inner member with respect to the member central axis of the outer cylindrical member. In the case of the above embodiment, it should suffice if at least the main rubber elastic body 16 on the front side and the main rubber elastic body 16 on the rear side are connected.

Furthermore, in a section in the axis-perpendicular direction, the shape of the outer peripheral surface or the inner peripheral surface of the main rubber elastic body is not limited, but is preferably a circular shape including an ellipse or an oblong circle, and more preferably, a perfectly circular shape as in the above embodiment. Also, the shape of the inner member or the outer cylindrical member is not limited. The shape of the fixed part of the inner member or the shape of the outer cylindrical member in the axis-perpendicular direction may be a circular shape including an ellipse or an oblong circle, or a polygonal shape.

Furthermore, in the above embodiment, the inner peripheral surface 36 of the main rubber elastic body 16 has a perfectly circular shape in a section in the axis-perpendicular direction. That is, the center of the opening and the center of the bottom of the recess 34 are in the same position in a section in the axis-perpendicular direction, and the surface length (length along the inner surface of the recess 34 in the longitudinal section shown in FIG. 3 and so on) from the center of the bottom to an opening end of the recess 34 is equal on both sides in the front-rear direction being the eccentric direction of the member central axis (inner central axis 22) of the inner member 12 with respect to the member central axis (outer central axis 32) of the outer cylindrical member 14. However, the disclosure is not limited thereto. For example, in a section in the axis-perpendicular direction, the center of the bottom of the recess may be out of alignment with the center of the opening of the recess in the eccentric direction of the member central axis of the inner member with respect to the member central axis of the outer cylindrical member, and the inner peripheral surface of the main rubber elastic body may have different surface lengths from the center of the bottom to the opening end of the recess on both sides in the eccentric direction.

On both sides in the eccentric direction of the central axis of the inner member with respect to the central axis of the outer cylindrical member, an aspect in which the outer peripheral surface of the main rubber elastic body has different surface lengths and an aspect in which the inner peripheral surface of the main rubber elastic body has different surface lengths may be adopted in combination. The surface length of both the outer peripheral surface and the inner peripheral surface may be increased on one side in the eccentric direction (the surface length of both the outer peripheral surface and the inner peripheral surface is reduced on the other side), or the surface length of the outer peripheral surface may be increased and the surface length of the inner peripheral surface may be reduced on one side in the eccentric direction (the surface length of the outer peripheral surface is reduced and the surface length of the inner peripheral surface is increased on the other side in the eccentric direction).

Furthermore, in the above embodiment, the inner member 12 is provided with the pin-like protrusion 28 as the circumferential positioning part, and the lower end of the inner member 12 is covered with the continuous rubber 40 integrally formed with the main rubber elastic body 16. However, in the case where the circumferential positioning part is provided and the front-rear direction of the vehicle is defined, a continuous rubber may not necessarily be provided, and the lower end of the inner member may be exposed to the inner surface of the recess. In the case where the continuous rubber is provided, a circumferential positioning part may not necessarily be provided.

Furthermore, the circumferential positioning part is not limited to the pin-like protrusion 28 of the above embodiment. That is, it should suffice if the front-rear direction of the vehicle can be defined by the circumferential positioning part. In addition to a protrusion protruding outward as in the above embodiment, a recess may be used, or a piece of paper or the like indicating a predetermined direction may be pasted, or a mark or the like for defining the front-rear direction may be applied. The circumferential positioning part may be provided on the outer cylindrical member or the main rubber elastic body instead of or in addition to the inner member.

Furthermore, in the above embodiment, the inner mounting axis 26 being the mounting central axis of the inner member 12 and the outer mounting axis (outer central axis 32) being the mounting central axis of the outer cylindrical member 14 are coaxial both before and after mounting of the engine mount 10 onto the vehicle. However, both mounting axes may be misaligned from each other at least one of before and after mounting of the vibration damping device onto the vehicle. That is, in the case where, for example, the mounting central axis of the inner member and the mounting central axis of the outer cylindrical member are misaligned from each other before mounting of the vibration damping device onto the vehicle, the amount of eccentricity of the member central axis of the inner member with respect to the member central axis of the outer cylindrical member may be set in consideration of the misalignment. Also in the case where, for example, the mounting central axis of the inner member and the mounting central axis of the outer cylindrical member are out of alignment due to mounting of the vibration damping device onto the vehicle, the amount of eccentricity of the member central axis of the inner member with respect to the member central axis of the outer cylindrical member may be set in consideration of the misalignment.

Furthermore, in the above embodiment, the engine mount 10 for an automobile is described as an example of the vibration damping device according to the disclosure. However, the vibration damping device according to the disclosure may be any vibration damping device to which loads of different magnitudes are input in mutually opposite directions in one direction orthogonal to a central axis. For example, a torque mount to which loads of different magnitudes are input on a driving side and a counter-driving side may be used. In the above embodiment, the vibration damping device (engine mount 10) is a so-called solid type vibration damping device in which a vibration damping effect is exhibited as rubber is deformed. However, the vibration damping device according to the disclosure may also be a fluid-filled vibration damping device in which a fluid chamber filled with an incompressible fluid is provided and a vibration damping effect based on the flow action of the fluid is utilized.

What is claimed is:

1. A vibration damping device, comprising:
an inner member;
an outer cylindrical member, arranged spaced apart on an outer peripheral side of the inner member; and
a main rubber elastic body, connecting the inner member and the outer cylindrical member, wherein
the main rubber elastic body has a truncated cone shape and comprises a recess open to a lower surface of the main rubber elastic body;
the inner member has a member central axis which is an inner central axis connecting, in the axial direction, sectional center points of sections of the inner member in the axis-perpendicular direction,
the member central axis of the inner member is eccentric with respect to a member central axis of the outer cylindrical member in an axis-perpendicular direction;
a free length of the main rubber elastic body in a direction in which the inner member and the outer cylindrical member face each other on one side in an eccentric direction and a free length of the main rubber elastic body in the direction in which the inner member and the outer cylindrical member face each other on an other side in the eccentric direction are made different from each other; and
a continuous rubber that covers a lower end of the inner member without exposing the lower end of the inner member to the recess and connects the main rubber elastic body on one side in the eccentric direction and the main rubber elastic body on the other side in the eccentric direction is integrally formed with the main rubber elastic body.

2. The vibration damping device according to claim 1, wherein
a mounting central axis of the inner member and a mounting central axis of the outer cylindrical member are coaxial.

3. The vibration damping device according to claim 1, wherein
an outer peripheral surface and an inner peripheral surface of the main rubber elastic body each have a circle shape in a section in the axis-perpendicular direction.

4. The vibration damping device according to claim 1, wherein
on at least one of an outer peripheral surface and an inner peripheral surface of the main rubber elastic body, a surface length is made different between both side portions in the eccentric direction of the member central axis of the inner member with respect to the member central axis of the outer cylindrical member.

5. A vibration damping device, comprising:
an inner member;
an outer cylindrical member, arranged spaced apart on an outer peripheral side of the inner member; and
a main rubber elastic body, connecting the inner member and the outer cylindrical member, wherein
the main rubber elastic body has a truncated cone shape and comprises a recess open to a lower surface of the main rubber elastic body;
a circumferential positioning part is provided for positioning the vibration damping device in a circumferential direction while the vibration damping device is mounted with a central axis direction thereof being an up-down direction of a vehicle, and a front-rear direction of the vehicle is defined by the circumferential positioning part; and
the inner member has a member central axis which is an inner central axis connecting, in the axial direction, sectional center points of sections of the inner member in the axis-perpendicular direction,
the member central axis of the inner member is arranged eccentric with respect to a member central axis of the outer cylindrical member in the front-rear direction of the vehicle, a free length of the main rubber elastic body extending to the front side of the vehicle from the inner member toward the outer cylindrical member and a free length of the main rubber elastic body extending to the rear side of the vehicle are made different from each other, and
a free length of the main rubber elastic body with which the inner member is displaced toward the outer cylindrical member during vehicle acceleration is larger than a free length of the main rubber elastic body with which the inner member is displaced away from the outer cylindrical member during vehicle acceleration.

6. The vibration damping device according to claim 5, wherein
a mounting central axis of the inner member and a mounting central axis of the outer cylindrical member are coaxial before and after mounting of the vibration damping device onto the vehicle.

7. The vibration damping device according to claim 6, wherein
an outer peripheral surface and an inner peripheral surface of the main rubber elastic body each have a circle shape in a section in an axis-perpendicular direction.

8. The vibration damping device according to claim 6, wherein
on at least one of an outer peripheral surface and an inner peripheral surface of the main rubber elastic body, a surface length is made different between both side portions in an eccentric direction of the member central axis of the inner member with respect to the member central axis of the outer cylindrical member.

9. The vibration damping device according to claim 5, wherein
an outer peripheral surface and an inner peripheral surface of the main rubber elastic body each have a circle shape in a section in an axis-perpendicular direction.

10. The vibration damping device according to claim 5, wherein
on at least one of an outer peripheral surface and an inner peripheral surface of the main rubber elastic body, a surface length is made different between both side portions in an eccentric direction of the member central axis of the inner member with respect to the member central axis of the outer cylindrical member.

* * * * *